United States Patent [19]

Sato et al.

[11] 3,927,381

[45] Dec. 16, 1975

[54] NON SIGNAL DETECTION TYPE AGC SYSTEM

[75] Inventors: Yashuhiro Sato; Chikao Hirabara, both of Tokyo, Japan

[73] Assignees: Oki Electric Industry Co., Ltd.; Nippon Telegraph and Telephone Public Corporation, both of Tokyo, Japan

[22] Filed: Aug. 15, 1974

[21] Appl. No.: 497,623

[30] Foreign Application Priority Data

Sept. 7, 1973 Japan .............................. 48-100259

[52] U.S. Cl. ...................... 330/29; 330/51; 330/145

[51] Int. Cl.[2] ........................................... H03G 3/30

[58] Field of Search ............ 330/29, 51, 207 P, 145; 325/42, 141, 402, 403, 478; 332/9 R, 11 R

[56] References Cited

UNITED STATES PATENTS

| | | | |
|---|---|---|---|
| 2,767,310 | 10/1956 | Walker | 325/478 |
| 3,374,437 | 3/1968 | Heald | 325/402 X |
| 3,478,271 | 11/1969 | Ison | 325/478 |
| 3,719,892 | 3/1973 | Yamazaki | 325/402 |
| 3,798,559 | 3/1974 | Tomita et al. | 330/145 X |

FOREIGN PATENTS OR APPLICATIONS

| | | | |
|---|---|---|---|
| 1,293,861 | 4/1969 | Germany | 330/51 |

*Primary Examiner*—James B. Mullins
*Attorney, Agent, or Firm*—Kenyon & Kenyon Reilly Carr & Chapin

[57] ABSTRACT

In an AGC amplifier, the gain of which is automatically controlled so as to obtain the constant output level, a switching circuit or a clamping circuit is arranged through the buffer circuit at the output of the AGC amplifier. The clamping circuit is controlled by a DC control signal in the AGC amplifier, and the level of said DC control signal corresponds to the input voltage of the AGC amplifier. The clamping circuit clamps the output of the buffer circuit connected to the AGC amplifier when the input voltage of the AGC amplifier is less than a predetermined value, thus, the level of any noise signal from the AGC amplifier when the gain is high due to the low input voltage is automatically clamped.

9 Claims, 6 Drawing Figures

NON SIGNAL DETECTION TYPE AGC SYSTEM

BACKGROUND OF THE INVENTION

The present invention relates to an AGC system and in particular, relates to a non signal detection type AGC system.

AGC is the abbreviation for Automatic Gain Control, and an AGC amplifier is used in many fields including a regenerative repeater in a PCM (Pulse Code Modulation) transmission line. An AGC amplifier functions to keep its output level constant although the input level of the amplifier may be changed. Accordingly, the lower the input level of the amplifier, the higher the gain of the amplifier; thus, even when no input signal is applied to the amplifier, some noise appears at the output of the amplifier. In a PCM regenerative repeater, the noise output may be sometimes recognized as a normal output signal and a normal pulse signal with normal amplitude and normal pulse width may be regenerated from the noise input. The regenerated output from the noise input is disadvantageous, in particular, in test and monitoring operations of a PCM transmission line. For instance, when a plurality of normal transmission lines and a single stand-by line are provided, an undesirable signal appears at the output of the stand-by line due to the noise and the cross-talk from a normal line. Therefore, in a test operation, although a test signal is applied only to a normal line, output signals appear at both the outputs of the normal line and the stand-by line, thus disturbing the test operation and further, it is difficult to find miswiring between a normal line and a stand-by line.

In order to overcome such a problem, an AGC amplifier with a minimum surplus gain has been proposed, and further, a constant resistor connected parallel or in series to the variable element of an AGC amplifier has been proposed for limiting the variable range of the variable element in the AGC amplifier. However, the above two proposals reduce the effect of the AGC amplifier, and further, in the above two proposals, the gain of the AGC amplifier is still maximal when no input signal is applied to the AGC amplifier; therefore, the above two proposals do not substantially solve the problem of a prior AGC amplifier.

SUMMARY OF THE INVENTION

The general purpose of the invention is to provide an AGC amplifier which clamps the output when no signal is applied to the input of the AGC amplifier.

It is an object, therefore, of the present invention to overcome the disadvantage of a prior AGC amplifier by providing a new and improved AGC amplifier.

It is also an object of the present invention to provide a new and improved method for controlling an AGC amplifier.

The above and other objects are attained by an AGC amplifier having a clamping circuit and a comparator, which causes the clamping circuit to clamp the output of the buffer circuit connected to the AGC amplifier, when the input level of the AGC amplifier is less than a predetermined value.

BRIEF DESCRIPTION OF THE DRAWINGS

The foregoing and other objects, features and attendant advantages of the invention will be appreciated as they are clarified by reference to the accompanying drawings wherein.

DETAILED DESCRIPTION OF THE PREFERRED EMBODIMENTS

Figure 1:
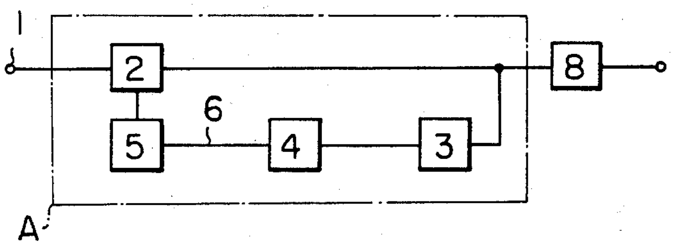
Fig. 1 PRIOR ART
FIG. 1 is a basic block diagram of a prior AGC amplifier.

FIG. 1 shows a prior AGC amplifier, in which reference number 1 indicates an input terminal, 2 indicates an amplifier, 3 indicates a signal detector, 4 indicates a direct-current amplifier, 5 indicates a variable impedance element, 6 indicates a control signal, and 8 indicates a buffer circuit which functions as a signal processor and is a pulse regenerator in the case of the PCM regenerative repeater. A box A outlined by the broken line composes a negative feedback loop of the AGC amplifier. In FIG. 1, an input signal applied to the input terminal 1 is amplified by the amplifier 2, the output of which is applied to the signal processor 8 and the signal detector 3. The signal detector 3 generates DC (direct current) voltage, the level of which is proportional to the peak voltage or power of the output signal of the amplifier 2. The DC voltage from the signal detector 3 is applied to the variable impedance element 5 as a control signal 6 through the direct-current amplifier 4. The signal detector 3 and/or the DC amplifier 4 has sufficient time-constant to keep the level of the control signal constant to cope with rapid change of the output signal of the amplifier 2. The control signal 6 is applied to the variable impedance element 5, the impedance of which changes according to the level of said control signal 6. The variable impedance element 5 is generally a diode. The change of impedance of the variable impedance element 5 changes the gain of the amplifier 2, thus, the output level of the amplifier 2 is held constant. The output of the amplifier 2 is also applied to the signal processor 8, which, in case of the PCM regenerative repeater, regenerates the waveform of the pulse signal, thus, the input pulse applied to the input terminal 1 is amplified and regenerated. However, the signal processor 8 sometimes provides a regenerated output pulse even when no input signal is applied to the input terminal 1, since the gain of the amplifier 2 is maximal when no input signal is applied to the input terminal 1, and noise of a considerable level is applied to the signal processor 8.

Figure 2:
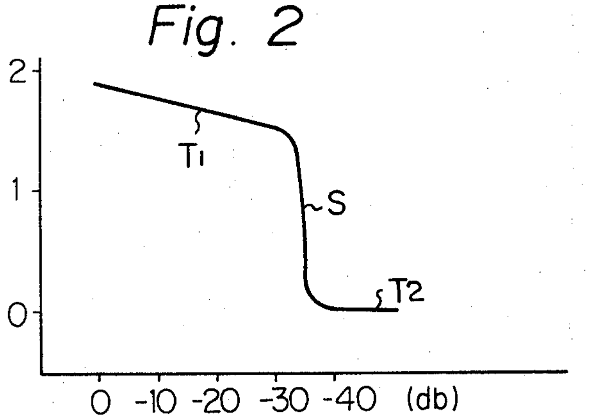
FIG. 2 is a curve of control characteristics of the AGC amplifier of FIG. 1.

FIG. 2 shows the characteristics curve of the control signal 6 of FIG. 1. In FIG. 2, the horizontal axis shows the level (db) of the input signal to the input terminal 1 and the vertical axis shows the relative level of the control signal 6. As is apparent from FIG. 2, the curve has a discontinuous step S. The step S is created because of the non-linear characteristics of a diode or the variable impedance element 5. The step S can divide the operational region of an AGC amplifier to a normal region $T_1$ and non signal region $T_2$.

Figure 3:
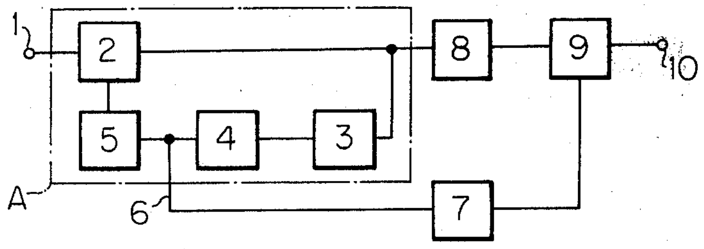
FIG. 3 is a basic block diagram of an AGC amplifier according to the present invention.
Figure 4:
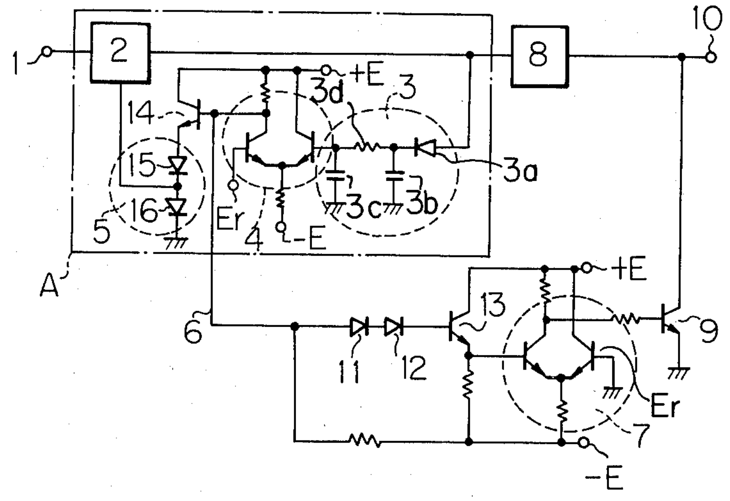
FIG. 4 is a detailed circuit diagram of the AGC amplifier of FIG. 3.

FIG. 3 is a basic block diagram of an AGC amplifier of the present invention, and FIG. 4 is an embodiment of a circuit diagram according to the block diagram of FIG. 3. It is apparent from FIG. 4 that the AGC amplifier of the present invention has a comparator 7 and a clamp circuit 9 together with AGC amplifier of FIG. 1. The comparator 7 compares the level of the control signal 6 with a predetermined value, and provides an output signal to the clamping circuit 9. The clamping circuit 9 clamps the output signal at an output terminal 10 when the level of the control signal 6 is smaller than a predetermined value.

Figure 5:
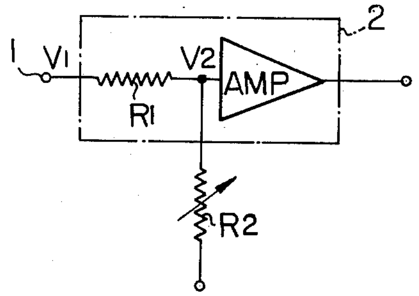
FIG. 5 is a control circuit of the AGC amplifier of FIG. 4.

In FIG. 4, the signal detector 3 comprises a diode 3_a_ for rectifying the output signal of the amplifier 2, and a pair of capacitors 3_b_ and 3_c_ and a resistor 3_d_ connected between said capacitors 3_b_ and 3_c_. A pair of capacitors 3_b_ and 3_c_ and the resistor 3_d_ function as a smoother for reducing the ripple voltage from the diode 3_a_. The output of the signal detector 3 is DC voltage, the level of which is proportional to the level of the output of the amplifier 2. The DC voltage from the signal detector 3 is amplified by the DC amplifier 4, the output of which is applied to a variable impedance element 5 through a transistor 14. In this embodiment, the variable impedance element 5 is composed of diodes 15 and 16, which is inserted in an emitter circuit of the transistor 14 through a diode 15. Therefore, the current strength in the diodes 15 and 16 depends upon the DC voltage out of the signal detector 3, and the level of the output of the amplifier 2. It is well known that the differential value of forward resistance of the diode changes according to the voltage or current applied to the diode, that is to say, the differential value of forward resistance of a diode is small when the applied voltage is high, and it is large when the applied voltage is low. Accordingly, the diodes 15 and 16 works as a variable resistor, the resistance of which changes according to the applied voltage proportional to the output level of the amplifier 2. The change of the differential value of the forward resistance of the diode 16 causes the change of the gain of the amplifier 2. FIG. 5 shows the equivalent circuit for explaining the variable gain control of the amplifier 2, in which $R_1$ is a resistor, $R_2$ is a variable resistor by means of the diodes 15 and 16, and AMP is an amplifier of constant gain. The input voltage $v_1$ applied to the input terminal 1 is divided by a divider composed of the resistors $R_1$ and $R_2$, and the divided voltage $v_2$ is applied to the amplifier AMP. The divided voltage $v_2$ is, of course, expressed as:

$$v_2 = \frac{R_2}{R_1 + R_2} v_1$$

Therefore, the voltage $v_2$ is controlled by an instantaneous value of the variable resistor $R_2$. From the above explanation, it is apparent that the total gain of the amplifier 2 which is the sum of the loss of the divider and the gain of the amplifier AMP, is controlled by the level of the control signal 6. It should be appreciated, of course, that the actual divider has some reactance elements and/or resistors for compensating the frequency response of a transmission line, although they are not shown in FIG. 5 for the sake of simplicity.

The control signal 6 is applied to one input of the comparator 7 through a pair of series connected diodes 11 and 12, and an emitter follower transistor 13. The other input of the comparator 7 is connected to the source of a predetermined voltage _Er_, which is, in the present embodiment, zero. A pair of diodes 11 and 12 function to shift the voltage level of the control signal 6, and to compensate the change of the level of the control signal 6 due to a change in voltage. The output level of the comparator 7 is high when the control signal 6 is low ($T_2$ in FIG. 2), and is low when the control signal 6 is high ($T_1$ in FIG. 2). Therefore, the clamping circuit 9, which is composed of a single transistor in this embodiment is conducted or closed when the control signal 6 is low and in the region $T_2$ of FIG. 2. When the transistor 9 is conducting, the output of the AGC amplifier is clamped and no signal appears at the output terminal 10.

Figure 6:
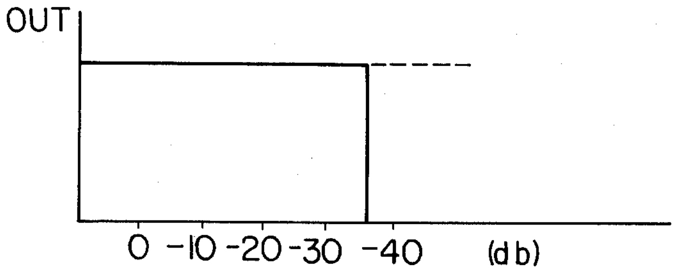
FIG. 6 is a characteristics curve of the AGC amplifier according to the present invention.

FIG. 6 shows the characteristics curve of the AGC amplifier of the present invention, in which the horizontal axis is the level of the input signal at the input terminal 1, and the vertical axis is the level of the output signal at the output terminal 10. The output level is constant since the output pulse is regenerated by the signal processor 8. When the input level is less than −36 db, the output signal no longer appears, since the clamping circuit 9 clamps the output terminal 10. The broken line in FIG. 6 indicates the characteristics of a prior art which does not have a clamping circuit 9. The broken line relating to less than −36 db does not correspond to an actual input signal, but to undesirable noise.

As explained above, the present invention overcomes the problem of the prior AGC amplifier which provided a false output even when no input signal was applied. Accordingly, the present AGC amplifier is extremely beneficial for a transmission line with large noise, a PCM regenerative repeater, etc.

Many modifications of the described embodiment may be possible to those skilled in the art. For instance, the clamping circuit 9 can be replaced by an ordinary switching circuit inserted in series in the circuit; further, the clamping circuit or a switching circuit can be connected within the signal processor 8 instead of the output terminal 10.

From the foregoing, it will now be apparent that a new and improved AGC amplifier has been found. It should be understood, of course, that the embodiment disclosed is merely illustrative and is not intended to limit the scope of the invention. Reference should be made to the appended claims for an indication of the scope of the invention.

What is claimed is:

1. An AGC amplifier circuit comprising:
   - an amplifier circuit means, having an input signal applied thereto,
   - a buffer circuit connected to the output of said amplifier,
   - a signal detector circuit connected to the output of said amplifier, for producing a DC control signal, the level of which is proportional to the output level of said amplifier,
   - a variable impedance circuit, connected to the output of said signal detector, the output of said variable impedance circuit being connected to said amplifier circuit to control the gain of said amplifier circuit according to the level of said DC control signal,
   - a comparator circuit connected to the output of the signal detector for comparing the level of said DC control signal with a predetermined value, and
   - a clamping circuit connected between the output of said comparator and the output of said buffer circuit for clamping the output signal of said buffer circuit in response to the output of said comparator.

2. An AGC amplifier according to claim 1, further comprising a DC amplifier connected to the output of said signal detector, the output of said DC amplifier being connected to the input of said variable impedance circuit for amplifying said DC control signal.

3. An AGC amplifier circuit as in claim 1, wherein the signal detector circuit is comprised of a diode connected to the output of said amplifier circuit for rectifying the output of said amplifier and a resistor and capacitor circuit connected to the output of said diode for reducing ripple voltage from said diode.

4. An AGC amplifier according to claim 1, wherein said variable impedance circuit comprises a diode circuit.

5. An AGC amplifier circuit as in claim 4 wherein the diode circuit comprises a pair of serially connected forward biased diodes the input of which is the output signal from the signal detector circuit, and the output from said diode circuit is taken between said diodes and connected to the amplifier circuit thereby controlling the gain of said amplifier circuit according to the level of said DC control signal.

6. An AGC amplifier circuit as in claim 5 further comprising a DC amplifier circuit connected to the output of said signal detector, the output of said DC amplifier being connected as an input to a transistor circuit having said diodes in an emitter circuit thereof.

7. An AGC amplifier circuit as in claim 6 wherein the comparator circuit is comprised of a circuit having a pair of serially connected diodes and a transistor circuit connected between the input to the comparator circuit and the output of the DC amplifier and wherein the clamping circuit comprises a transistor circuit connected between the output of the comparator and the buffer circuit.

8. An AGC amplifier according to claim 1 wherein said buffer circuit comprises a pulse regenerative circuit.

9. An AGC amplifier circuit comprising:

an amplifier circuit means having an input signal applied thereto, a buffer circuit connected to the output of said amplifier, a signal detector circuit for producing a DC control signal, the level of which is proportional to the output level of said amplifier, said circuit comprised of a diode for rectifying the output of said amplifier and a resistor and capacitor circuit connected to the output of said diode for reducing ripple voltage from said diode, a DC amplifier circuit connected to the output of said signal detector, a diode circuit connected as a variable impedance circuit to the output of said DC amplifier, said diode circuit comprising a pair of serially connected forward biased diodes the input of which is the output of a transistor circuit having said diodes in the emitter circuit thereof and having the output of the DC amplifier connected to the base thereof, the output of said diode circuit being taken between said diodes and connected to the amplifier circuit to control the gain of said amplifier circuit means according to the level of said DC control signal, a comparator circuit connected to the output of the DC amplifier circuit comprising a pair of serially connected diodes, the output of said diodes being connected to the base of a first transistor circuit, and a comparator circuit connected to the emitter circuit of said first transistor circuit, said comparator circuit comprising second and third transistor circuits, said second transistor circuit having its base connected to the emitter of said first transistor circuit, and its emitter connected in common to the emitter of said third transistor circuit and both emitters then being connected through a resistor to a fixed negative potential, said third transistor circuit being connected to a fixed positive potential, its base being connected to a predetermined fixed positive potential, said collector of said second transistor being connected through a resistor to the same fixed positive potential as said third transistor, and a clamping circuit comprised of a transistor having its base connected to the collector of the second transistor, its emitter being connected to ground and its collector connected to the output of the buffer circuit whereby the output of said buffer circuit is turned off when the level of the DC control signal is smaller than a predetermined value.

* * * * *

UNITED STATES PATENT AND TRADEMARK OFFICE

CERTIFICATE OF CORRECTION

PATENT NO. : 3,927,381

DATED : December 16, 1975

INVENTOR(S) : Yasuhiro Sato and Chikao Hirabara

It is certified that error appears in the above–identified patent and that said Letters Patent are hereby corrected as shown below:

Please correct the spelling of inventor's name from "Yashuhiro Sato" to --Yasuhiro Sato--.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*